United States Patent
Misciagna et al.

(10) Patent No.: US 11,130,589 B2
(45) Date of Patent: Sep. 28, 2021

(54) CRASH FORCE ATTENUATING FUEL SYSTEM

(71) Applicant: The Boeing Company, Chicago, IL (US)

(72) Inventors: David Thomas Misciagna, West Chester, PA (US); Douglas R. Ludin, Malvern, PA (US)

(73) Assignee: The Boeing Company, Chicago, IL (US)

( * ) Notice: Subject to any disclaimer, the term of this patent is extended or adjusted under 35 U.S.C. 154(b) by 381 days.

(21) Appl. No.: 16/275,446

(22) Filed: Feb. 14, 2019

(65) Prior Publication Data

US 2020/0262577 A1   Aug. 20, 2020

(51) Int. Cl.
  *B64D 37/32*      (2006.01)
  *B64D 37/06*      (2006.01)
  *B64C 27/10*      (2006.01)

(52) U.S. Cl.
  CPC .............. *B64D 37/32* (2013.01); *B64D 37/06* (2013.01); *B64C 27/10* (2013.01)

(58) Field of Classification Search
  CPC ........ B64D 37/32; B64D 37/12; B64D 37/26; B64D 37/06; B64C 27/04; B64C 27/06; B64C 27/08; B64C 27/10; F17C 2201/0185; F17C 2201/018
  See application file for complete search history.

(56) References Cited

U.S. PATENT DOCUMENTS

| | | | | |
|---|---|---|---|---|
| 5,007,557 A | * | 4/1991 | Spence | A01K 63/006 119/245 |
| 5,451,015 A | * | 9/1995 | Cronkhite | B64D 37/04 244/135 R |
| 5,813,680 A | * | 9/1998 | Shaw | B62B 1/264 220/573 |
| 7,909,288 B2 | * | 3/2011 | Anghileri | B64D 45/0015 244/129.2 |
| 2002/0047016 A1 | * | 4/2002 | Ishikawa | B60K 15/03 220/562 |
| 2006/0243858 A1 | * | 11/2006 | Anghileri | B64C 27/006 244/118.1 |
| 2015/0004013 A1 | * | 1/2015 | Giovangrossi | F17C 1/00 417/275 |
| 2015/0144643 A1 | * | 5/2015 | Cruz | F17C 1/16 220/586 |
| 2019/0071187 A1 | * | 3/2019 | Kozar | F16F 7/127 |

* cited by examiner

*Primary Examiner* — Joshua J Michener
*Assistant Examiner* — Cindi M Curry
(74) *Attorney, Agent, or Firm* — Yee & Associates, P.C.

(57) ABSTRACT

A fuel system for a rotorcraft is provided. The fuel system comprises a housing, a fuel bladder located within the housing, a first fuel reservoir, and a number of pressure relief valves. The first fuel reservoir is in fluid communication with the fuel bladder and stowed within the housing. The number of pressure relief valves are configured to divert fuel from the fuel bladder into the first fuel reservoir at a predetermined pressure such that the first fuel reservoir expands to reduce forces on the housing during a crash event.

20 Claims, 10 Drawing Sheets

CRASH FORCE ATTENUATING FUEL SYSTEM

BACKGROUND INFORMATION

1. Field

The present disclosure relates generally to rotorcraft. More specifically, the present disclosure relates to a fuel system designed to reduce forces on structural components of the rotorcraft during a crash event.

2. Background

Rotorcrafts are used in a variety of fields from search and rescue missions to military applications. Manufacturers of rotorcraft are constantly seeking design improvements to reduce weight of the rotorcraft, thus making it possible to increase the number of occupants that can travel in the rotorcraft, improve fuel efficiency, decrease fabrication cost, and increase rotorcraft speed. These design improvements must be mindful of survivability of occupants during undesired events. One such undesired event may be a crash event.

The ability of the rotorcraft to absorb energy during a crash event is key to protecting its occupants. Rotorcrafts are equipped with a variety of safety features that increase the survivability of the occupants. However, heavy masses within the rotorcraft still prove problematic. One of these heavy masses is fuel. Fuel is unable to absorb crash energy because it is incompressible. Upon impact, hydrodynamic pressure waves can move through the fuel, transferring large forces to surrounding structures in the rotorcraft. These forces may cause significant structural damage to the rotorcraft and reduce the survivability of its occupants.

Therefore, it would be desirable to have a method and apparatus that takes into account at least some of the issues discussed above, as well as other possible issues.

SUMMARY

An illustrative embodiment of the present disclosure provides a fuel system for a rotorcraft. The fuel system comprises a housing, a fuel bladder, a first fuel reservoir, and a number of pressure relief valves. The fuel bladder is located within the housing. The first fuel reservoir is in fluid communication with the fuel bladder and stowed within the housing. The number of pressure relief valves are configured to divert fuel from the fuel bladder into the first fuel reservoir at a predetermined pressure such that the first fuel reservoir expands to reduce forces on the housing during a crash event.

Another illustrative embodiment of the present disclosure provides a method for reducing forces during a crash event of a rotorcraft. Fuel is diverted from a fuel bladder into a first fuel reservoir using a number of pressure relief valves when a pressure in the fuel bladder reaches a predetermined pressure. The first fuel reservoir expands as more fuel is diverted from the fuel bladder.

A further illustrative embodiment of the present disclosure provides a rotorcraft comprising a housing, a fuel bladder, a first fuel reservoir, a number of pressure relief valves and a first blowout panel. The fuel bladder is located within the housing. The first fuel reservoir is in fluid communication with the fuel bladder and stowed within the housing. The number of pressure relief valves is configured to release fuel from the fuel bladder into the first fuel reservoir at a predetermined pressure such that the first fuel reservoir expands outward. The first blowout panel is located in the housing and configured to release outward as the first fuel reservoir expands to reduce forces on the housing during a crash event.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that it is desirable to increase survivability of occupants in a rotorcraft during a crash event. Currently employed rotorcraft designs have implemented improvements such as crashworthy seats and energy absorbing structures. The illustrative embodiments recognize and take into account, however, that such improvement may not attenuate crash forces from heavy masses in the rotorcraft. These heavy masses may transfer forces that crush surrounding structural components during a crash event. For example, the full force of fuel tank pressure can cause damage to adjoining structures. The loss of structural integrity may decrease the ability of the rotorcraft housing to protect its occupants.

The illustrative embodiments further recognize and take into account that it is desirable to keep the rotorcraft as light as possible. In order to increase the structural integrity of the rotorcraft housing, some currently used safety solutions incorporate more rigid or heavy structures, potentially increasing the weight of the rotorcraft. Reinforcements of this type do not necessarily absorb the desired amount of crash force from fuel or other heavy masses.

Thus, the disclosed embodiments provide a fuel system for a rotorcraft. The fuel system comprises a housing, a fuel bladder located within the housing, a first fuel reservoir, a number of pressure relief valves, and a blowout panel. The first fuel reservoir is in fluid communication with the fuel bladder and stowed within the housing while the rotorcraft is in operation. As the rotorcraft descends during a crash event, the number of pressure relief valves are configured to divert fuel from the fuel bladder into the first fuel reservoir at a predetermined pressure. The first fuel reservoir expands to reduce forces on the housing during impact. The first blowout panel is configured to release outward as the first fuel reservoir expands.

Figure 1:
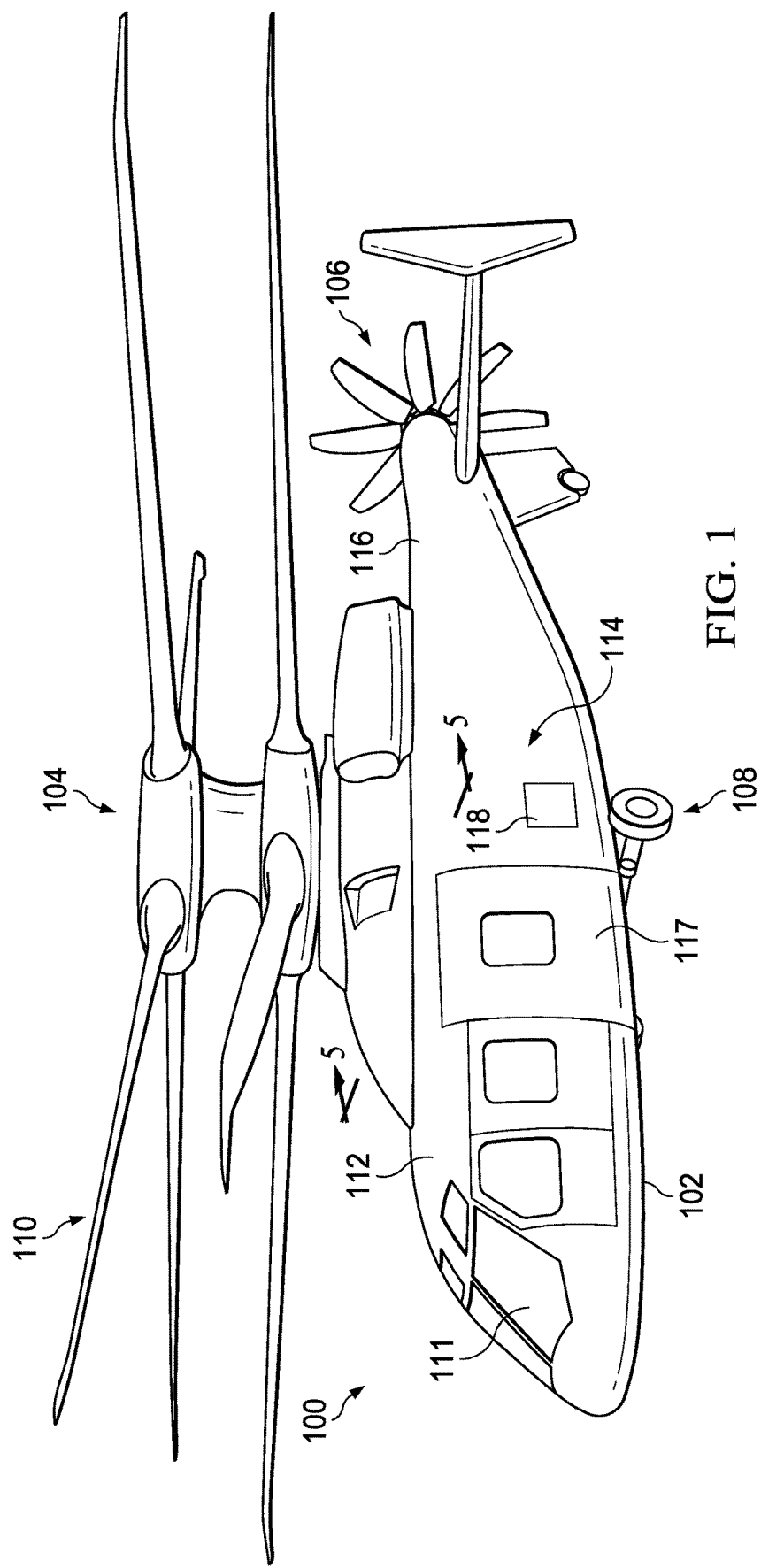
FIG. 1 is an illustration of a rotorcraft in accordance with an illustrative embodiment.

With reference now to the figures and, in particular, with reference to FIG. 1, an illustration of a rotorcraft is depicted in accordance with an illustrative embodiment. Rotorcraft 100 takes the form of a helicopter in this illustrative example.

As depicted, rotorcraft 100 includes fuselage 102, rotor system 104, propeller system 106, and landing gear 108. Rotor system 104 is equipped with a transmission (not shown in this view) and blades 110.

In this illustrative example, fuselage 102 of rotorcraft 100 has cockpit 111, cabin 112, fuel bay 114, and tail section 116 aft of fuel bay 114. Fuselage 102 comprises skin 117. Panel 118 is in skin 117 of fuel bay 114. Panel 118 is a blowout panel in this illustrative example.

Figure 2:
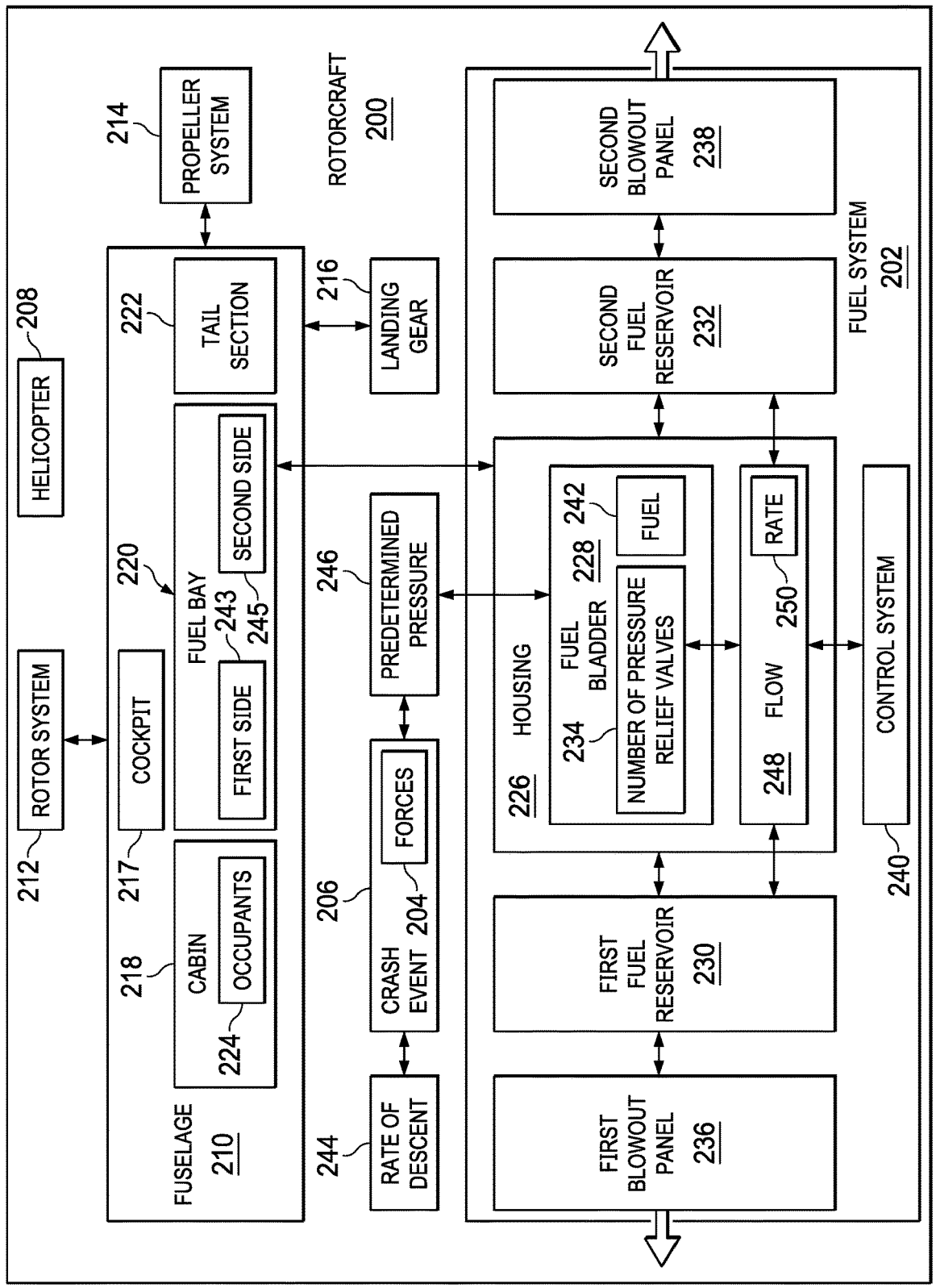
FIG. 2 is an illustration of a block diagram of a rotorcraft in accordance with an illustrative embodiment.

Turning now to FIG. 2, an illustration of a block diagram of a rotorcraft is depicted in accordance with an illustrative embodiment. Rotorcraft 200 is an example of one type of platform where fuel system 202 may be implemented. Fuel system 202 may be configured to reduce forces 204 during crash event 206 of rotorcraft 200. Rotorcraft 200 takes the form of helicopter 208 in this illustrative example.

As depicted, rotorcraft 200 comprises fuel system 202, fuselage 210, rotor system 212, propeller system 214, and landing gear 216. Fuselage 210 includes cockpit 217, cabin 218, fuel bay 220, and tail section 222. Fuel system 202 is located in fuel bay 220 in fuselage 210 of rotorcraft 200. Occupants 224 travel in rotorcraft 200. Occupants 224 may include passengers in cabin 218 or pilots in cockpit 217.

In this illustrative example, rotor system 212 and propeller system 214 are configured to provide movement of rotorcraft 200 in a desired direction. Landing gear 216 includes various components that assist during landing of rotorcraft 200.

As illustrated, fuel system 202 comprises housing 226, fuel bladder 228, first fuel reservoir 230, second fuel reservoir 232, number of pressure relief valves 234, first blowout panel 236, second blowout panel 238, and control system 240. As used herein, "a number of" when used with reference to items means one or more items. Thus, a number of pressure relief valves is one or more pressure relief valves.

In this illustrative example, housing 226 provides structural support for fuel system 202. Fuel bladder 228 is located in housing 226. Housing 226 may comprise a number of structures surrounding fuel bladder 228 and configured to absorb at least some of forces 204 applied by fuel bladder 228 during crash event 206. Housing 226 is configured to absorb forces 204 as a method of protection for occupants 224 in cabin 218. Fuel bladder 228 contains fuel 242 for rotorcraft 200. Fuel bladder 228 may be a flexible or rigid container, depending on the particular implementation. Fuel bladder 228 may be located aft of cabin 218 or may be an underfloor fuel bladder in some illustrative examples.

As depicted, first fuel reservoir 230 and second fuel reservoir 232 are compartments configured to receive fuel 242 from fuel bladder 228. First fuel reservoir 230 and second fuel reservoir 232 are flexible containers in this illustrative example. First fuel reservoir 230 and second fuel reservoir 232 are in fluid communication with fuel bladder 228. Fuel 242 may be diverted into at least one of first fuel reservoir 230 or second fuel reservoir 232 at a desired point during operation of rotorcraft 200. Prior to this time, first fuel reservoir 230 and second fuel reservoir 232 may be empty or deflated.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

When rotorcraft 200 is in operation, first fuel reservoir 230 and second fuel reservoir 232 are stowed within housing 226 of fuel system 202. When stowed within housing 226, first fuel reservoir 230 and second fuel reservoir 232 do not contain fuel 242. In one illustrative example, first fuel reservoir 230 may be located on first side 243 of fuel bay 220 in fuselage 210, while second fuel reservoir may be located on second side 245 of fuel bay 220 opposite first side 243 in fuselage 210.

In another illustrative example, both first fuel reservoir 230 and second fuel reservoir 232 may be located on the same side of fuel bladder 228, for example, behind fuel bladder 228 in tail section 222 of fuselage 210. In such an example, the fuel reservoirs may expand in an aft-direction inside rotorcraft 200.

In this illustrative example, number of pressure relief valves 234 are a type of one-way safety valve used to limit pressure buildup in fuel bladder 228. Number of pressure relief valves 234 are configured to divert fuel 242 from fuel bladder 228 at predetermined pressure 246. In other words, number of pressure relief valves 234 open at predetermined pressure 246.

As crash event 206 occurs, rotorcraft 200 descends toward the ground at rate of descent 244. Rate of descent 244 may vary given the circumstances of crash event 206.

Number of pressure relief valves 234 divert fuel 242 from fuel bladder 228 into first fuel reservoir 230 at predetermined pressure 246 such that first fuel reservoir 230 expands to reduce forces 204 on housing 226 during crash event 206. In a similar fashion, number of pressure relief valves 234 divert fuel 242 from fuel bladder 228 into second fuel reservoir 232 at predetermined pressure 246 such that second fuel reservoir 232 expands to reduce forces 204 on housing 226 during crash event 206. First fuel reservoir 230 and second fuel reservoir 232 are configured to fully expand by the time rotorcraft 200 reaches impact.

Predetermined pressure 246 is a pressure associated with crash event 206. Number of pressure relief valves 234 open in a desired manner as crash event 206 begins to occur. Number of pressure relief valves 234 may be passive valves or active valves. In this illustrative example, fuel bladder 228 comprises a number of blowout membranes configured to burst at predetermined pressure 246 to initiate flow 248 of fuel 242 through number of pressure relief valves 234 into at least one of first fuel reservoir 230 or second fuel reservoir 232.

When number of pressure relief valves 234 are passive, fuel 242 may be diverted from fuel bladder 228 at a constant rate 250 of flow 248. When number of pressure relief valves are active, fuel 242 may be diverted from fuel bladder 228 at varying rate 250. For example, without limitation, rate 250 of flow 248 may change based on rate of descent 244 of rotorcraft 200.

In this illustrative example, control system 240 may be implemented in fuel system 202 to control rate 250 of flow 248 of fuel 242 out of fuel bladder 228. Control system 240 may be in communication with various other control systems, sensors, and actuators in rotorcraft 200 to calculate a desired rate 250 of flow 248 of fuel 242 from fuel bladder 228 as rotorcraft 200 descends toward the ground. Control system 240 then changes rate 250 of flow 248 of fuel 242 through number of pressure relief valves 234 accordingly. Control system 240 in fuel system 202 may be part of an overall crash management system for rotorcraft 200.

As illustrated, first blowout panel 236 is associated with first fuel reservoir 230. First blowout panel 236 is a structure configured to "blow out" or open as first fuel reservoir 230 expands as fuel 242 continues to flow within first fuel reservoir 230. First blowout panel 236 may be inside rotorcraft 200, as part of housing 226, in which case, first fuel reservoir 230 may expand into a compartment within rotorcraft 200. First blowout panel 236 also may be associated with fuselage 210. In such an illustrative example, first blowout panel 236 releases outward, into the outside environment around rotorcraft 200, such that first fuel reservoir 230 expands outward.

In a similar fashion, second blowout panel 238 is associated with second fuel reservoir 232. Second blowout panel 238 is a structure configured to "blow out" or open as second fuel reservoir 232 expands as fuel 242 continues to flow within second fuel reservoir 232. Second blowout panel 238 may be inside rotorcraft 200, as part of housing 226, in which case, second fuel reservoir 232 may expand into a compartment within rotorcraft 200. Second blowout panel 238 also may be associated with fuselage 210. In such an illustrative example, second blowout panel 238 releases outward, into the outside environment around rotorcraft 200, such that second fuel reservoir 232 expands outward.

With an illustrative embodiment, forces 204 from impact of fuel 242 are diverted from housing 226 in fuel bay 220 of rotorcraft 200 to reduce damage to the structural integrity of rotorcraft 200. As a result, forces 204 are attenuated and the heavy masses associated with fuel 242 are displaced, reducing potential crush force on occupants 224 in cabin 218 and/or cockpit 217. Thus, the use of an illustrative embodiment increases survivability of occupants 224 during crash event 206 of rotorcraft 200.

Further, because forces 204 from fuel 242 are attenuated, rotorcraft 200 may be designed in a manner that saves weight and improves versatility. For example, fewer structural reinforcements may be needed with the use of an illustrative embodiment, therefore resulting in weight savings.

An illustrative embodiment allows rotorcraft 200 to be designed with complete control of flow 248 of fuel 242 out of fuel bladder 228. Since first fuel reservoir 230 and second fuel reservoir 232 are stowed until crash event 206 begins, space savings are also realized.

Figure 3:
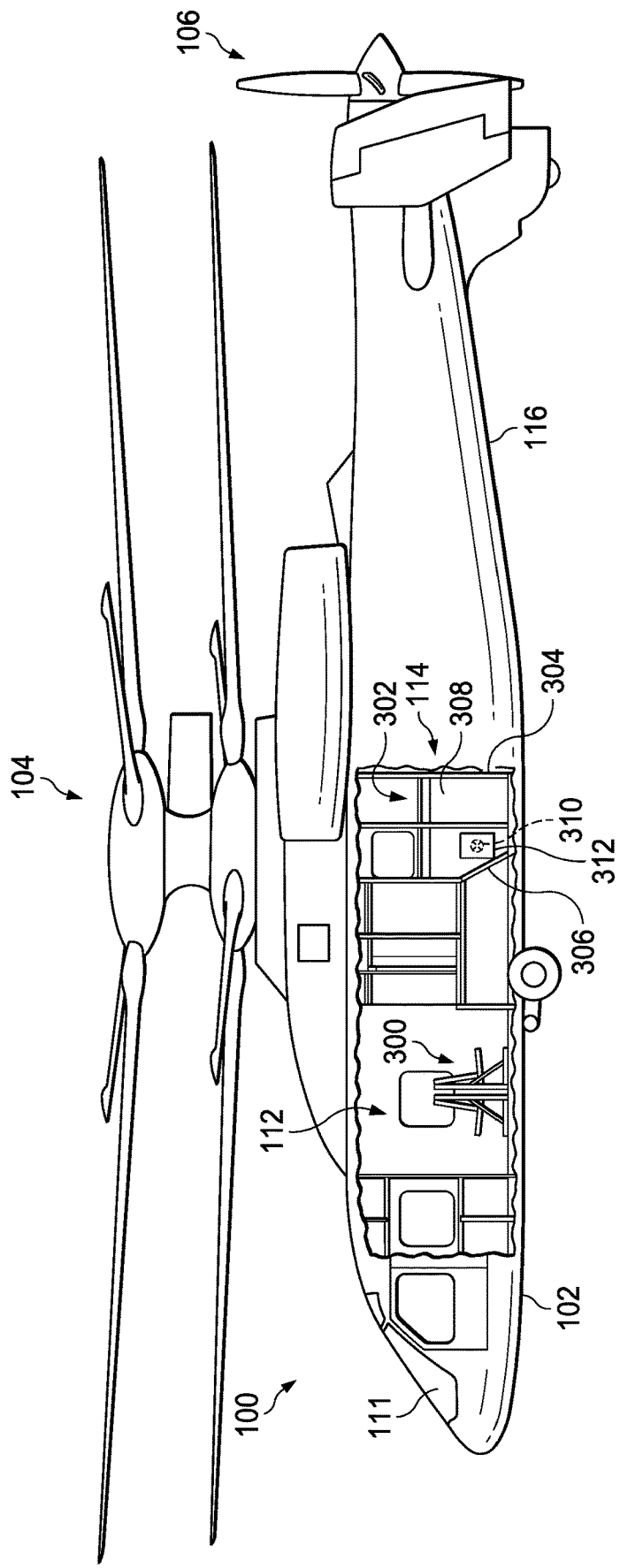
FIG. 3 is an illustration of a cutaway view of a rotorcraft in accordance with an illustrative embodiment.

With reference next to FIG. 3, an illustration of a cutaway view of a rotorcraft is depicted in accordance with an illustrative embodiment. A side cutaway view of rotorcraft 100 from FIG. 1 is shown with a portion of skin 117 of fuselage 102 removed. FIG. 3 illustrates an example of physical implementations for components within rotorcraft 200 as shown in block form in FIG. 2.

As depicted, cabin 112 of rotorcraft 200 has seats 300. Pilot seats and flight controls (not shown in this view) are located within cockpit 111. Fuel system 302 is located within fuel bay 114, between bulkhead 304 and cabin 112. Fuel system 302 includes housing 306, fuel bladder 308, pressure relief valve 310, and reservoir 312. Reservoir 312 corresponds to blowout panel 118 in FIG. 1. Reservoir 312 is in a stowed position in this illustrative example.

Figure 4:
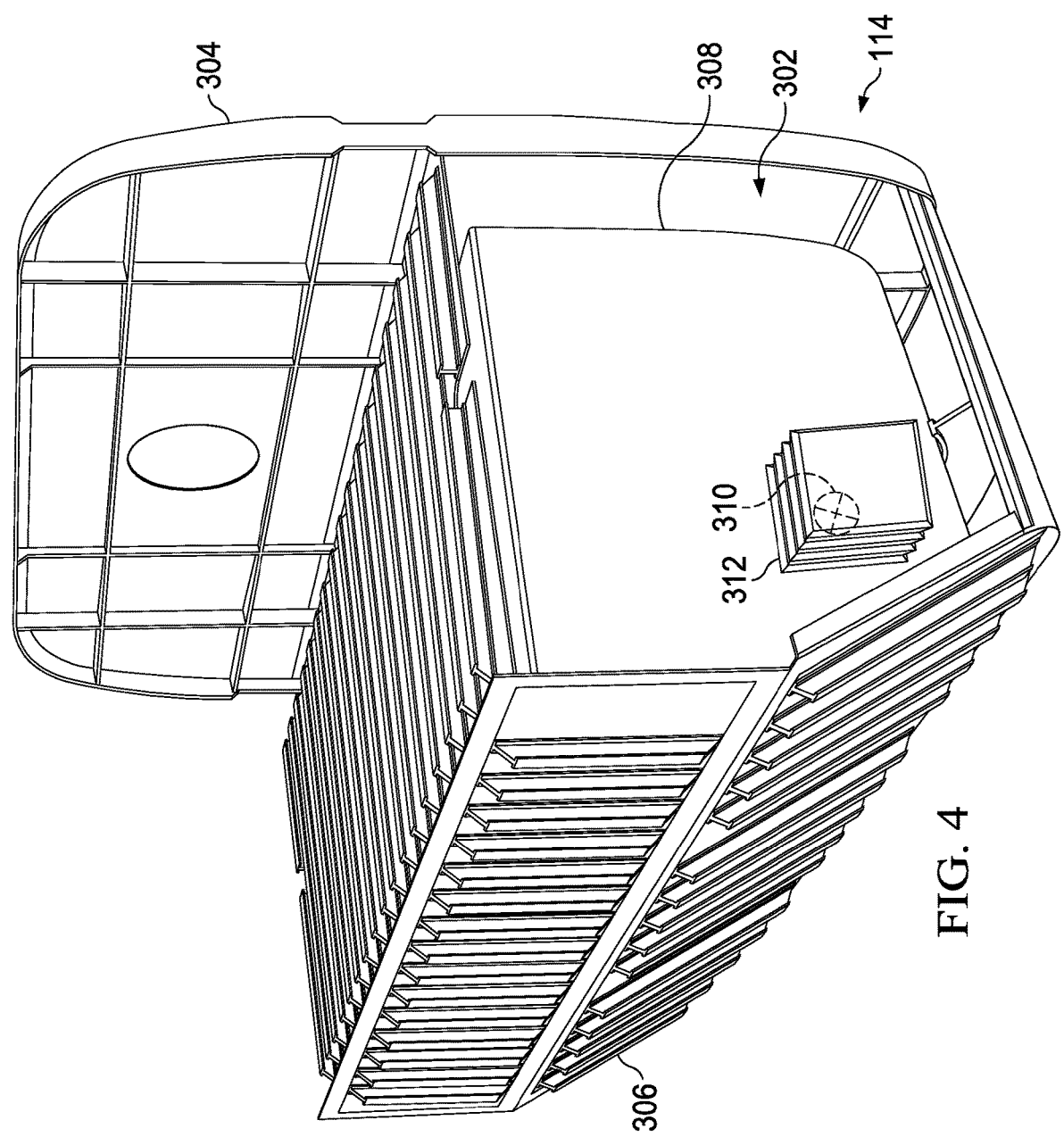
FIG. 4 is an illustration of a fuel bay of a rotorcraft in accordance with an illustrative embodiment.

FIG. 4 is an illustration of a perspective view of a fuel bay in accordance with an illustrative embodiment. Fuel bay 114 is shown in greater detail. Pressure relief valve 310 begins to divert fuel from fuel bladder 308 as pressure mounts in fuel bladder 308. Reservoir 312 is shown in a slightly expanded state in this illustrative example.

Figure 5:
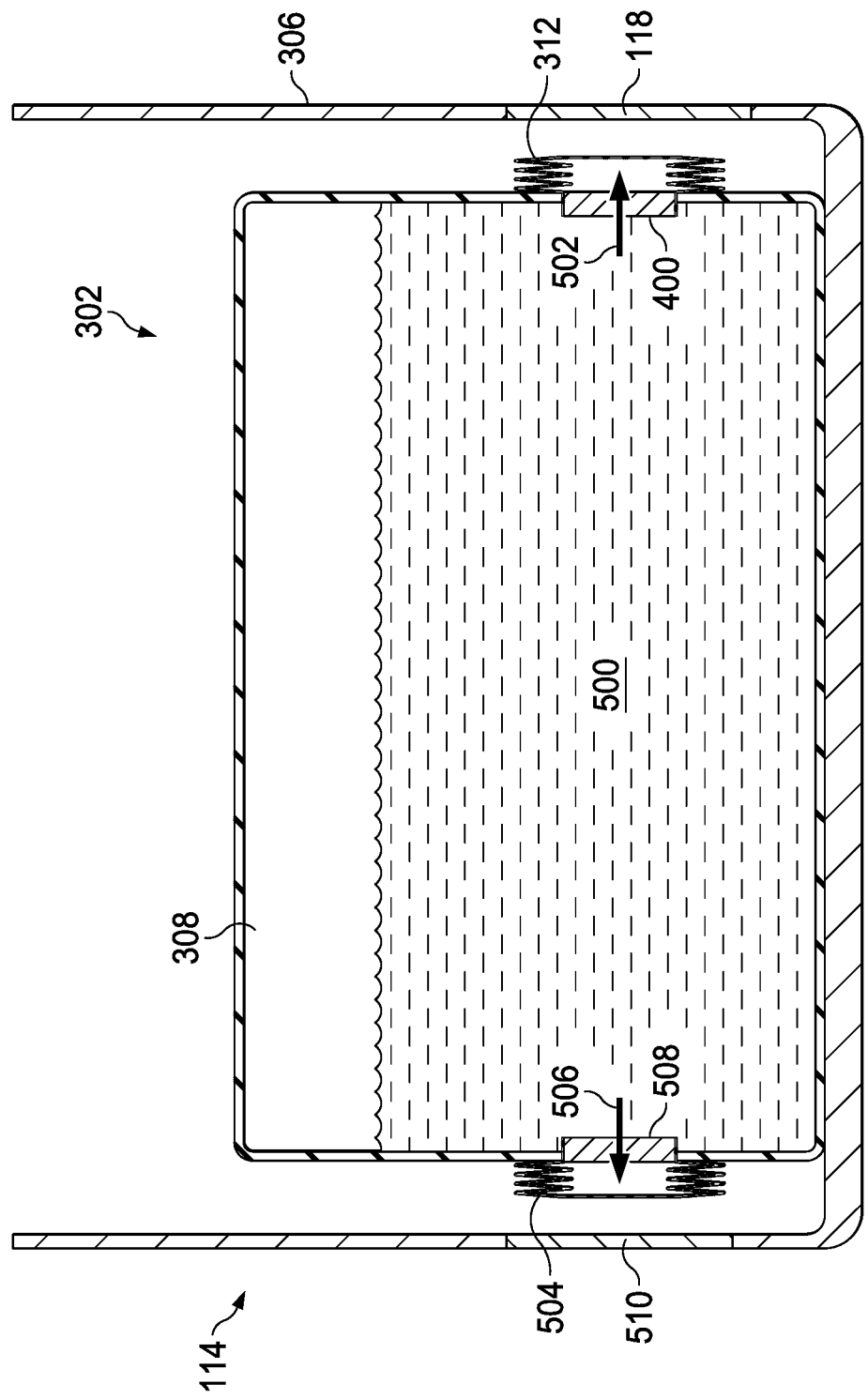
FIG. 5 is an illustration of a cross-sectional view of a fuel bay during a crash event in accordance with an illustrative embodiment.
Figure 6:
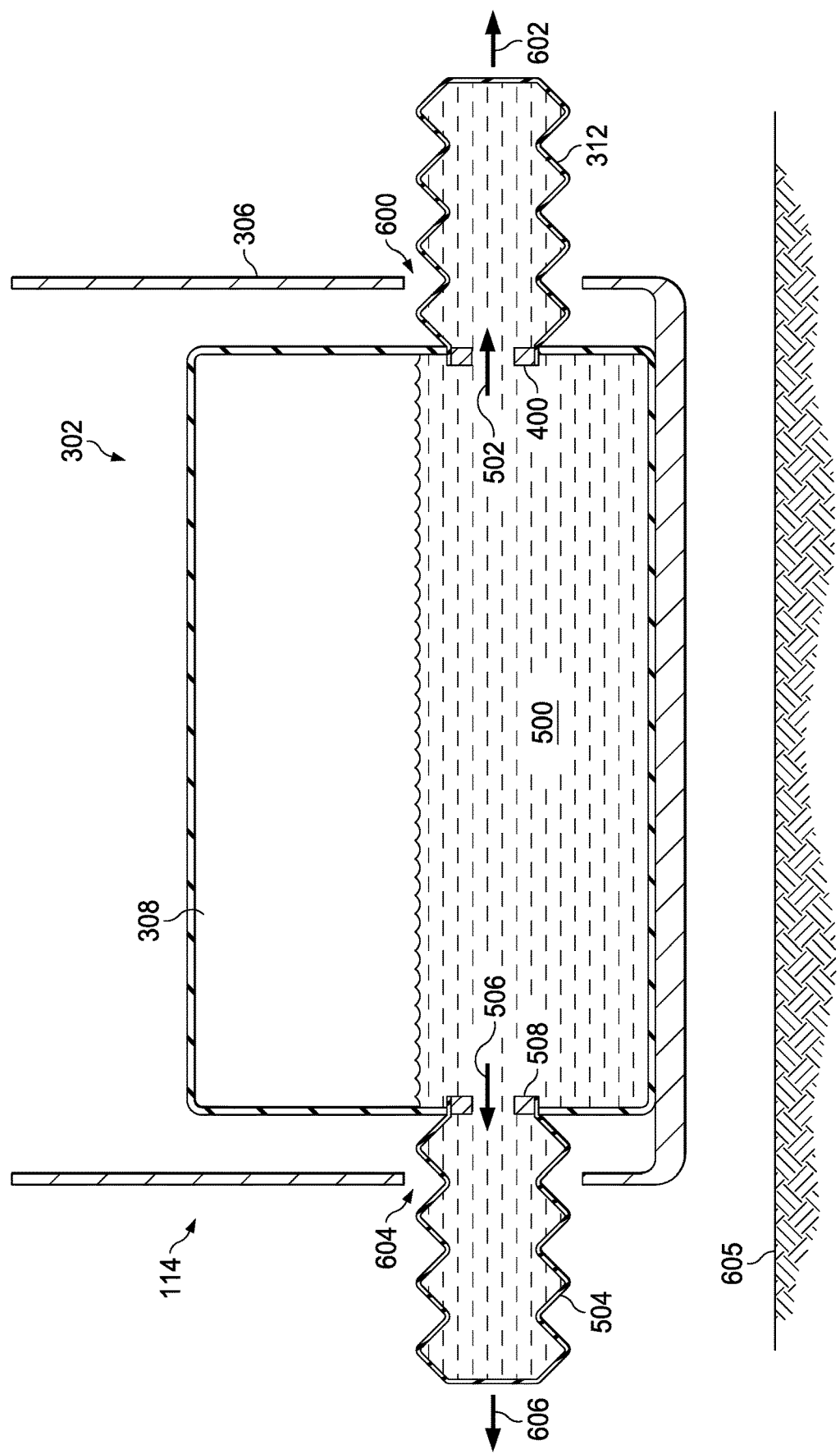
FIG. 6 is an illustration of a cross-sectional view of a fuel bay right before impact in accordance with an illustrative embodiment.

FIG. 5 and FIG. 6 show illustrations of a cross-sectional view of a fuel system in accordance with an illustrative embodiment. The cross-sectional view is taken along lines 5-5 in FIG. 1. In FIG. 5, fuel has just begun to flow out of fuel bladder 308. In FIG. 6, just before impact, the fuel reservoirs are almost fully expanded.

Turning to FIG. 5, pressure has exceeded the predetermined flow pressure within fuel bladder 308. Fuel 500 has started to flow from fuel bladder 308 into reservoir 312 in the direction of arrow 502 through pressure relief valve 400. On the other side of fuel bladder 308, fuel 500 is simultaneously flowing into reservoir 504 in the direction of arrow 506 through pressure relief valve 508.

As depicted, reservoir 312 has not expanded enough to blowout panel 118 in fuselage 102. Similarly, reservoir 504 has not expanded enough to blowout panel 510 in fuselage 102.

Next, FIG. 6 shows fuel system 302 right before impact. As fuel 500 flows through pressure relief valve 400, reservoir 312 blows out panel 118 and expands through opening 600 in the direction of arrow 602. As fuel 500 flows through pressure relief valve 508, reservoir 504 blows out panel 510 and expands through opening 604 in the direction of arrow 606. Fuel system 302 is designed such that reservoir 312 and reservoir 504 are as expanded as possible when rotorcraft 100 impacts ground 605.

Figure 7:
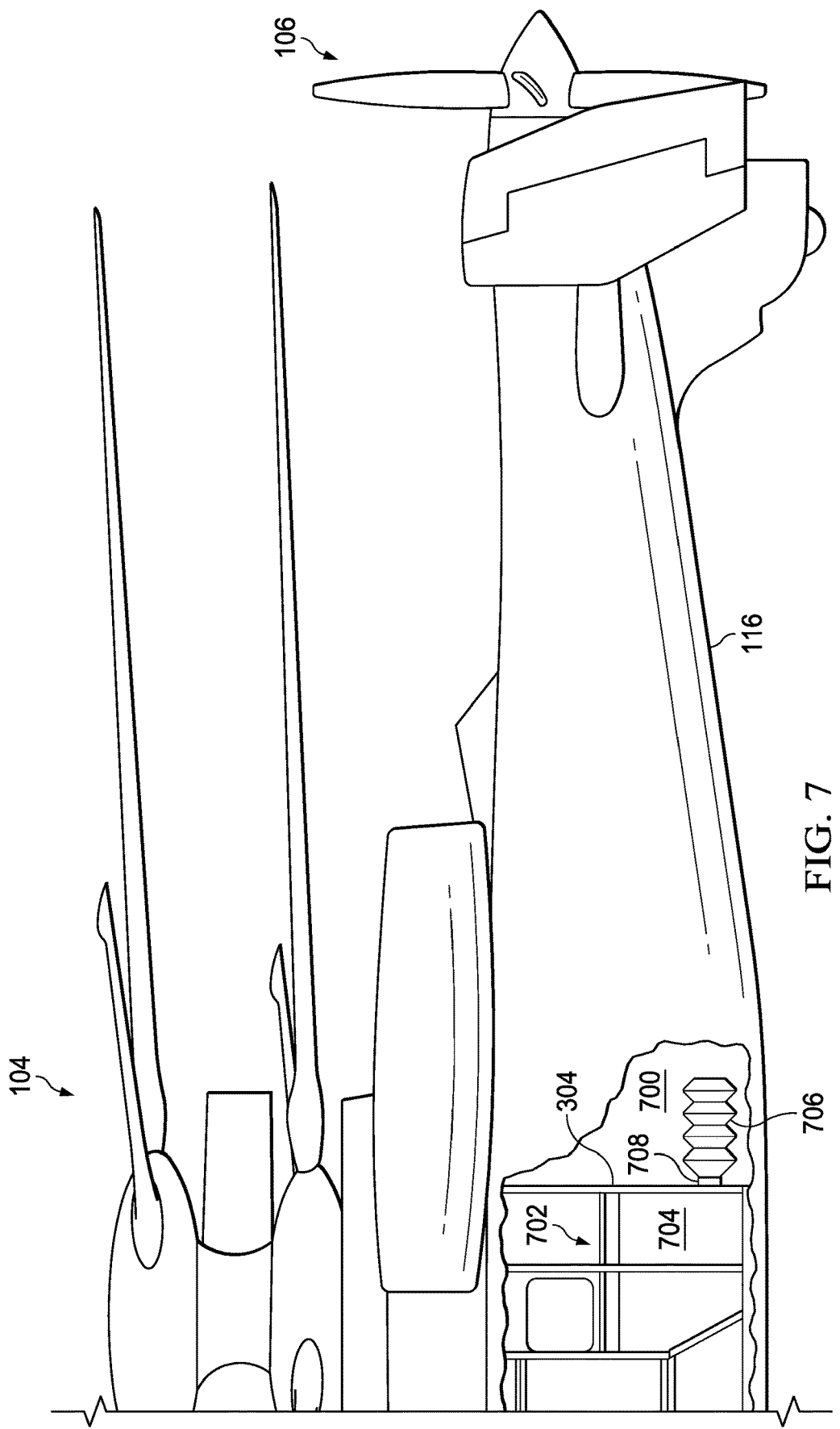
FIG. 7 is an illustration of a rotorcraft with an aft-diverting fuel system in accordance with an illustrative embodiment.

Turning now to FIG. 7, an illustration of a rotorcraft with an aft-diverting fuel system is depicted in accordance with an illustrative embodiment. FIG. 7 shows an alternative physical implementation for components in fuel system 202 shown in block form in FIG. 2.

As illustrated, tail section 116 of fuselage 102 comprises compartment 700 aft of bulkhead 304. Unlike FIGS. 3-6, fuel system 702 diverts fuel in bladder 704 into reservoir 706 through pressure relief valve 708, instead of out the sides of rotorcraft 100. All components in fuel system 702 work in a similar fashion as described with reference to FIGS. 3-6.

The different components shown in FIG. 1 and FIGS. 3-7 may be combined with components in FIG. 2, used with components in FIG. 2, or a combination of the two. Additionally, some of the components in FIG. 1 and FIGS. 3-7 may be illustrative examples of how components shown in block form in FIG. 2 may be implemented as physical structures. Other configurations for fuel system 302 may be implemented other than those shown in FIGS. 3-7.

For instance, blowout panel 118 and blowout panel 510 may be absent in some illustrative embodiments. Instead, rotorcraft 100 may be designed such that reservoir 312 or reservoir 504 expands into a compartment adjacent to it, without expanding to the outside environment of rotorcraft 100. In other illustrative examples, only one reservoir may be present. In still other illustrative example, fuel bay 114 with fuel system 302 may be located under the floor of cabin 112.

Although one pressure relief valve is shown in fluid communication with fuel reservoir 312 in FIGS. 3-4, any number of pressure relief valves may be used. Two, three, five or more valves may be present. Some valves may trigger at varying pressures. For instance, one set of pressure relief valves may start flow of fuel out of fuel bladder 308 at a first predetermined pressure. A second set of pressure relief valves may be configured to start flow of fuel out of fuel bladder 308 at a higher pressure. Various other implementations are possible.

Further, even though two fuel reservoirs are shown in FIGS. 5-6, any number of reservoirs may be used. The reservoirs may be positioned on the same side, opposite of one another, or in some other configuration. Only one fuel reservoir may be present in some illustrative examples.

In some instances, a rotorcraft may have more than one fuel bladder. Each fuel bladder may be controlled separately, releasing fuel into a reservoir at the same pressure or difference pressures. If a fuel bladder reaches a certain size, and baffles are present, a pressure relief valve will be located in each baffle to let fuel flow freely during a crash event.

Figure 8:
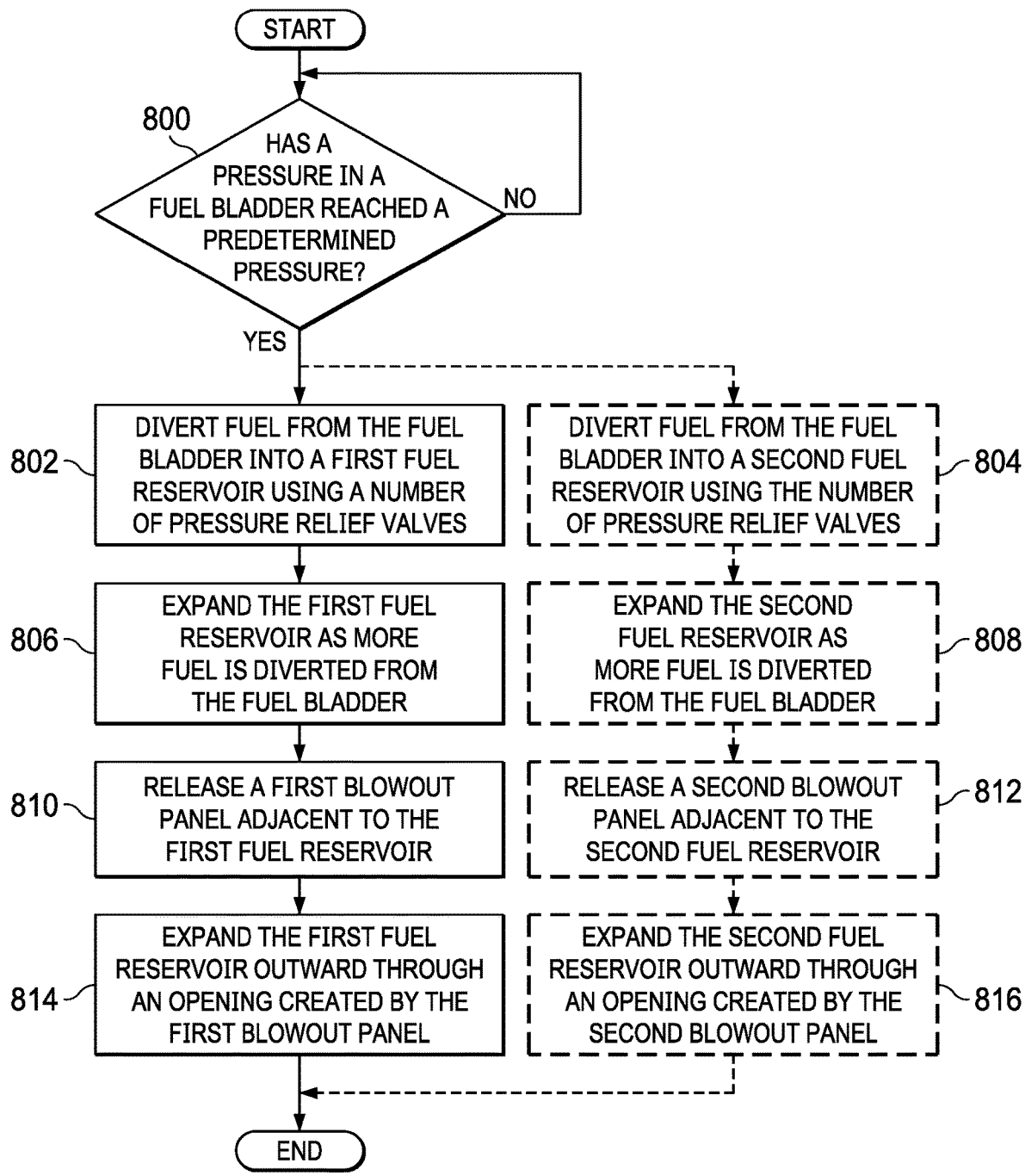
FIG. 8 is an illustration of a flowchart of a process for reducing forces during a crash event by diverting fuel from a fuel system in accordance with an illustrative embodiment.

With reference next to FIG. 8, an illustration of a flowchart of a process for reducing forces during a crash event is depicted in accordance with an illustrative embodiment. The method depicted in FIG. 8 may be used with fuel system 202 in FIG. 2 to divert fuel from a fuel bladder into one or more reservoirs. This process may be used in a passive system, where fuel is diverted into the fuel reservoirs at a constant rate of flow.

The process begins by determining whether a pressure in a fuel bladder has reached a predetermined pressure (operation 800). If the pressure in the fuel bladder has not reached a predetermined pressure, the process returns to operation 800. If the pressure in the fuel bladder reaches the predetermined pressure, fuel is diverted from the fuel bladder into a first fuel reservoir using a number of pressure relief valves (operation 802).

At the same time, fuel is diverted from the fuel bladder to a second fuel reservoir using the number of pressure relief valves (operation 804). The use of a second fuel reservoir is optional, depending on the design of the rotorcraft.

Next, the process expands the first fuel reservoir as more fuel is diverted from the fuel bladder (operation 806). If a second fuel reservoir is used, the second fuel reservoir expands as more fuel is diverted from the fuel bladder (operation 808).

The process then releases a first blowout panel adjacent to the first fuel reservoir (operation 810). The blowout panel releases in response to the pressure of the first fuel reservoir. A second blowout panel adjacent to the second fuel reservoir is also released at substantially the same time, in response to the pressure of the second fuel reservoir (operation 812).

The process next expands the first fuel reservoir outward through an opening created by the first blowout panel (operation 814). The second fuel reservoir expands outward through an opening created by the second blowout panel (operation 816), with the process terminating thereafter.

Figure 9:
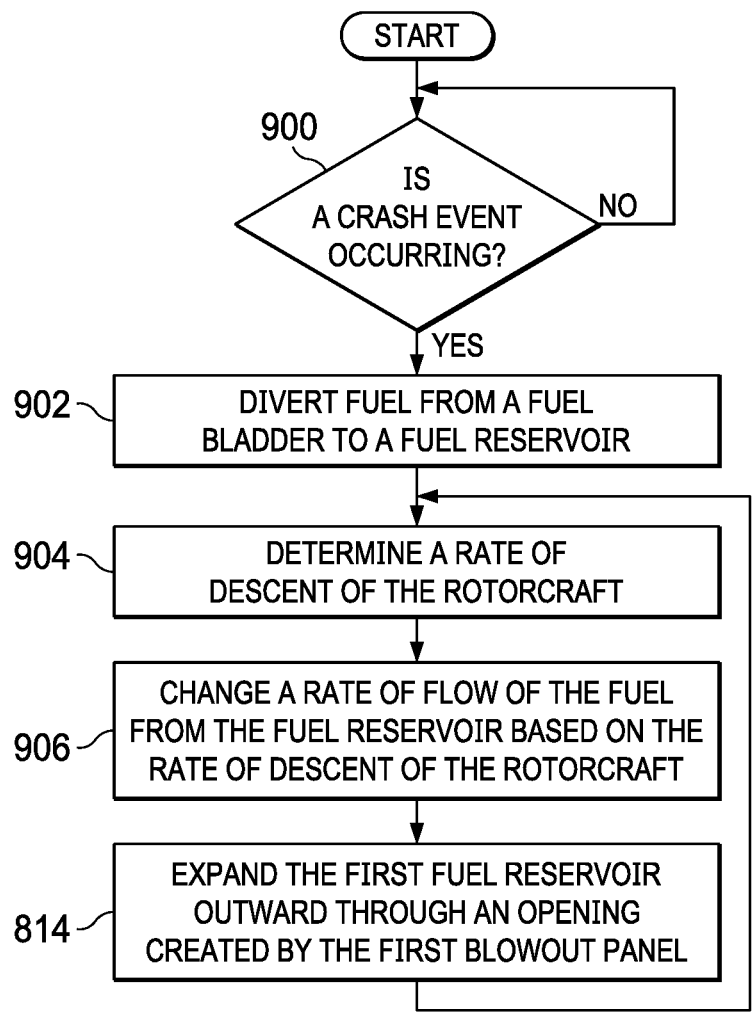
FIG. 9 is an illustration of a flowchart of a process for controlling the rate of flow of fuel in a fuel system during a crash event in accordance with an illustrative embodiment.

Turning now to FIG. 9, an illustration of a flowchart of a process for controlling the rate of flow of fuel in a fuel system during a crash event is depicted in accordance with an illustrative embodiment. The method depicted in FIG. 9 may be used with fuel system 202 in FIG. 2 to divert fuel from a fuel bladder into one or more reservoirs as shown. The process described in FIG. 9 is implemented when control of the pressure relief valves in fuel system 202 is active.

The process begins by determining whether a crash event is occurring (operation 900). If a crash event is occurring, the process begins to divert fuel from a fuel bladder to a fuel reservoir (operation 902). If a crash event is not occurring, no fuel is diverted from the fuel bladder and the process returns to operation 900.

Next, the process determines a rate of descent of the rotorcraft (operation 904). The process then changes a rate of flow of the fuel from the fuel bladder to the fuel reservoir based on the rate of descent of the rotorcraft (operation 906). For example, a control system may adjust the size of the opening in a pressure relief valve to allow for more fuel flow outward. The process returns to operation 904 until impact. If a blowout panel is present, the fuel reservoir will release that panel as it expands.

The flowcharts and block diagrams in the different depicted illustrative embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

Figure 10:
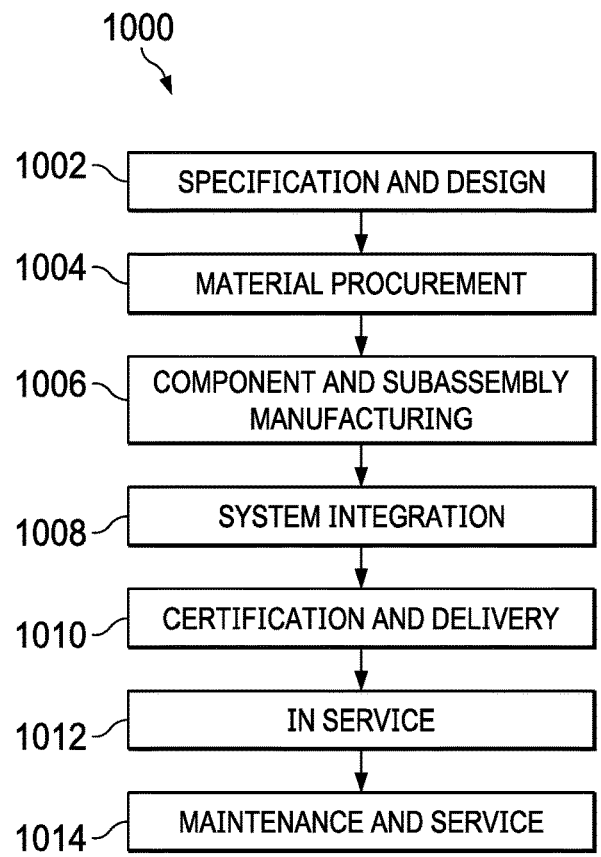
FIG. 10 is an illustration of a block diagram of a rotorcraft manufacturing and service method in accordance with an illustrative embodiment.
Figure 11:
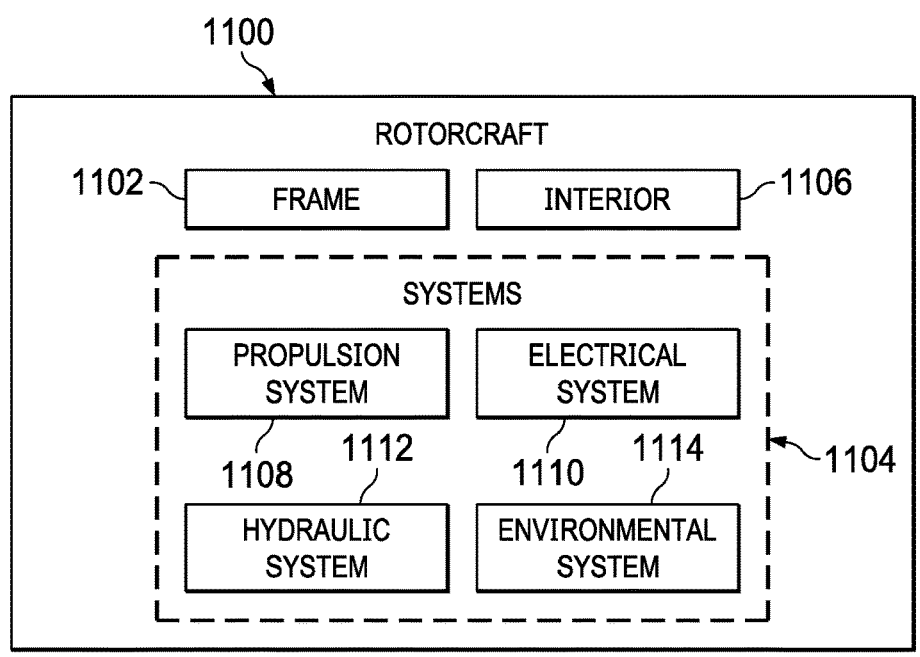
FIG. 11 is an illustration of a block diagram of a rotorcraft in which an illustrative embodiment may be implemented.

Illustrative embodiments of the disclosure may be described in the context of rotorcraft manufacturing and service method 1000 as shown in FIG. 10 and rotorcraft 1100 as shown in FIG. 11. Turning first to FIG. 10, an illustration of a block diagram of a rotorcraft manufacturing and service method is depicted in accordance with an illustrative embodiment. During pre-production, rotorcraft manufacturing and service method 1000 may include specification and design 1002 of rotorcraft 1100 in FIG. 11 and material procurement 1004.

During production, component and subassembly manufacturing 1006 and system integration 1008 of rotorcraft 1100 in FIG. 11 takes place. Thereafter, rotorcraft 1100 in FIG. 11 may go through certification and delivery 1010 in order to be placed in service 1012. While in service 1012 by a customer, rotorcraft 1100 in FIG. 11 is scheduled for routine maintenance and service 1014, which may include modification, reconfiguration, refurbishment, and other maintenance or service.

Fuel system 202 from FIG. 2 may be made during component and subassembly manufacturing 1006. In addition, components within fuel system 202 may be implemented during routine maintenance and service 1014 as part of a modification, reconfiguration, or refurbishment of rotorcraft 1100 in FIG. 11.

Each of the processes of rotorcraft manufacturing and service method 1000 may be performed or carried out by a system integrator, a third party, an operator, or some combination thereof. In these examples, the operator may be a customer. For the purposes of this description, a system integrator may include, without limitation, any number of rotorcraft manufacturers and major-system subcontractors; a third party may include, without limitation, any number of vendors, subcontractors, and suppliers, and an operator may be an airline, a leasing company, a military entity, a service organization, and so on.

With reference now to FIG. 11, an illustration of a block diagram of a rotorcraft is depicted in which a composite structure made using an illustrative embodiment may be implemented. In this example, rotorcraft 1100 is produced by rotorcraft manufacturing and service method 1000 in FIG. 10 and may include frame 1102 with plurality of systems 1104 and interior 1106. Examples of systems 1104 include one or more of propulsion system 1108, electrical system 1110, hydraulic system 1112, and environmental system 1114. Any number of other systems may be included. Although an aerospace example is shown, different illustrative embodiments may be applied to other industries, such as the automotive industry.

Apparatuses and methods embodied herein may be employed during at least one of the stages of rotorcraft manufacturing and service method 1000 in FIG. 10. In one illustrative example, components or subassemblies produced in component and subassembly manufacturing 1006 in FIG. 10 may be fabricated or manufactured in a manner similar to components or subassemblies produced while rotorcraft 1100 is in service 1012 in FIG. 10. As yet another example, one or more apparatus embodiments, method embodiments, or a combination thereof may be utilized during production stages, such as component and subassembly manufacturing 1006 and system integration 1008 in FIG. 10. One or more apparatus embodiments, method embodiments, or a combination thereof may be utilized while rotorcraft 1100 is in service 1012, during maintenance and service 1014 in FIG. 10, or both. The use of a number of the different illustrative embodiments may substantially expedite the assembly of rotorcraft 1100, reduce the cost of rotorcraft 1100, or both expedite the assembly of rotorcraft 1100 and reduce the cost of rotorcraft 1100.

With the use of an illustrative embodiment, forces from fuel loads are attenuated during a crash event, making it less likely for surrounding structural components to fail. Therefore, the structural components may better withstand a crash event and absorb crash force on impact, protecting the occupants inside the rotorcraft. The illustrative embodiments provide a solution that increases survivability of occupants while simultaneously providing potential weight savings for the rotorcraft. Since the fuel reservoirs are stowed within the rotorcraft, only small modifications are needed to retrofit current rotorcraft designs.

An illustrative embodiment may be implemented to meet crashworthiness index scores in military aircraft, as well as other applications. The apparatuses and methods disclosed herein reduce weight while providing equivalent or better protection and exceeding crashworthiness design requirements.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A fuel system for a rotorcraft, the fuel system comprising:
   a housing;
   a fuel bladder located within the housing;
   a first fuel reservoir in fluid communication with the fuel bladder and stowed within the housing; and
   a number of pressure relief valves configured to divert fuel from the fuel bladder into the first fuel reservoir at a predetermined pressure such that the first fuel reservoir expands to reduce forces on the housing during a crash event;
   wherein the first fuel reservoir is configured to fully expand before the rotorcraft reaches impact of the crash event.

2. The fuel system of claim 1 further comprising:
   a first blowout panel associated with the first fuel reservoir and configured to release outward as the first fuel reservoir expands.

3. The fuel system of claim 2 further comprising:
   a second fuel reservoir in fluid communication with the fuel bladder and stowed within the housing, wherein the number of pressure relief valves is further configured to divert the fuel from the fuel bladder into the second fuel reservoir at the predetermined pressure.

4. The fuel system of claim 3 further comprising:
   a second blowout panel in the housing and adjacent to the second fuel reservoir, wherein the second blowout panel is configured to release outward as the second fuel reservoir expands.

5. The fuel system of claim 4 wherein the housing is a fuselage and the first fuel reservoir is located on a first side of the fuselage and the second fuel reservoir is located on a second side of the fuselage opposite the first side.

6. The fuel system of claim 1, wherein the number of pressure relief valves is configured to divert the fuel from the fuel bladder into the first fuel reservoir at a constant rate of flow.

7. The fuel system of claim 1 further comprising:
   a control system configured to change a rate of flow of the fuel through the number of pressure relief valves based on a rate of descent of the rotorcraft.

8. The fuel system of claim 1, wherein the first fuel reservoir is located behind the fuel bladder and is configured to expand inside the rotorcraft.

9. A method for reducing forces during a crash event of a rotorcraft, the method comprising:
   diverting fuel from a fuel bladder into a first fuel reservoir using a number of pressure relief valves when a pressure in the fuel bladder reaches a predetermined pressure;
   expanding the first fuel reservoir as more of the fuel is diverted from the fuel bladder;

releasing a first blowout panel adjacent to the first fuel reservoir;

expanding the first fuel reservoir outward through an opening created by the first blowout panel;

diverting the fuel from the fuel bladder into a second fuel reservoir using the number of pressure relief valves when the pressure in the fuel bladder reaches the predetermined pressure;

releasing a second blowout panel adjacent to the second fuel reservoir;

expanding the second fuel reservoir outward through an opening created by the second blowout panel; and fully expanding at least one of the first fuel reservoir or the second fuel reservoir before the rotorcraft reaches impact.

10. The method of claim 9 further comprising:

diverting the fuel from the fuel bladder into the first fuel reservoir at a constant rate of flow.

11. The method of claim 9 further comprising:

determining a rate of descent of the rotorcraft.

12. The method of claim 11 further comprising:

changing a rate of flow of the fuel through the number of pressure relief valves based on the rate of descent of the rotorcraft.

13. A rotorcraft comprising:

a housing for a fuel system;

a fuel bladder located within the housing;

a first fuel reservoir in fluid communication with the fuel bladder and stowed within the housing;

a number of pressure relief valves configured to release fuel from the fuel bladder into the first fuel reservoir at a predetermined pressure such that the first fuel reservoir expands outward; and a first blowout panel in the housing configured to release outward as the first fuel reservoir expands to reduce forces on the housing during a crash event;

wherein the first fuel reservoir is configured to fully expand before the rotorcraft reaches impact of the crash event.

14. The rotorcraft of claim 13 further comprising:

a second fuel reservoir in fluid communication with the fuel bladder and stowed within the housing, wherein the number of pressure relief valves is further configured to divert the fuel from the fuel bladder to the second fuel reservoir at the predetermined pressure; and a second blowout panel in the housing and adjacent to the second fuel reservoir, wherein the second blowout panel is configured to release outward as the second fuel reservoir expands.

15. The rotorcraft of claim 14 further comprising:

a control system configured to control a rate of flow of the fuel from the fuel bladder into at least one of the first fuel reservoir or the second fuel reservoir.

16. The rotorcraft of claim 14, wherein the second fuel reservoir is configured to fully expand before the rotorcraft reaches impact.

17. A fuel system for a rotorcraft, the fuel system comprising:

a housing;

a fuel bladder located within the housing;

a first fuel reservoir in fluid communication with the fuel bladder and stowed within the housing;

a number of pressure relief valves configured to divert fuel from the fuel bladder into the first fuel reservoir at a predetermined pressure such that the first fuel reservoir expands to reduce forces on the housing during a crash event;

a first blowout panel associated with the first fuel reservoir and configured to release outward as the first fuel reservoir expands;

a second fuel reservoir in fluid communication with the fuel bladder and stowed within the housing, wherein the number of pressure relief valves is further configured to divert the fuel from the fuel bladder into the second fuel reservoir at the predetermined pressure; and a second blowout panel in the housing and adjacent to the second fuel reservoir, wherein the second blowout panel is configured to release outward as the second fuel reservoir expands;

wherein the housing is a fuselage and the first fuel reservoir is located on a first side of the fuselage and the second fuel reservoir is located on a second side of the fuselage opposite the first side.

18. A fuel system for a rotorcraft, the fuel system comprising:

a housing;

a fuel bladder located within the housing;

a first fuel reservoir in fluid communication with the fuel bladder and stowed within the housing; and a number of pressure relief valves configured to divert fuel from the fuel bladder into the first fuel reservoir at a predetermined pressure such that the first fuel reservoir expands to reduce forces on the housing during a crash event;

wherein the number of pressure relief valves is configured to divert the fuel from the fuel bladder into the first fuel reservoir at a constant rate of flow.

19. A fuel system for a rotorcraft, the fuel system comprising:

a housing;

a fuel bladder located within the housing;

a first fuel reservoir in fluid communication with the fuel bladder and stowed within the housing;

a number of pressure relief valves configured to divert fuel from the fuel bladder into the first fuel reservoir at a predetermined pressure such that the first fuel reservoir expands to reduce forces on the housing during a crash event; and a control system configured to change a rate of flow of the fuel through the number of pressure relief valves based on a rate of descent of the rotorcraft.

20. A fuel system for a rotorcraft, the fuel system comprising:

a housing;

a fuel bladder located within the housing;

a first fuel reservoir in fluid communication with the fuel bladder and stowed within the housing; and a number of pressure relief valves configured to divert fuel from the fuel bladder into the first fuel reservoir at a predetermined pressure such that the first fuel reservoir expands to reduce forces on the housing during a crash event;

wherein the first fuel reservoir is located behind the fuel bladder and is configured to expand inside the rotorcraft.

* * * * *